March 20, 1945.  J. W. ASPENLEITER  2,371,729
HINGE
Filed Jan. 6, 1944

JOSEPH W. ASPENLEITER
INVENTOR
BY
ATTORNEYS

Patented Mar. 20, 1945

2,371,729

UNITED STATES PATENT OFFICE 2,371,729

HINGE

Joseph W. Aspenleiter, Rochester, N. Y., assignor to Bausch & Lomb Optical Company, Rochester, N. Y., a corporation of New York Application January 6, 1944, Serial No. 517,209

2 Claims. (Cl. 16—159)

This invention relates to improvements in cases and more particularly to hinge constructions for cases formed from zylonite, Celluloid, or other non-metallic materials.

Heretofore, considerable difficulty has been experienced in obtaining a serviceable hinge for plastic cases which would be efficient in performance over an extended period of use. Plastic hinges were unsatisfactory for the tubular hinge members were easily broken by the hinge wire. It has been proposed to mount metal hinges in the plastic cover and body of the case, but due to the difficulty of securing a bond between metal and plastic by cementing operations, these hinges have been frictionally mounted in the plastic cover and body of the case. Metal hinges thus mounted are undesirable for they increase the molding expenses of the case, break down in use, and are bulky.

The hinge structure of the present invention utilizes a metal hinge but it obviates the difficulty had in prior metal hinge attachments by securing the metal hinge to plastic strips and then cementing the plastic strips to the plastic body and cover of the case. Although the hinge may be secured to the plastic strips in any manner insuring the fixed attachment of the same, in the preferred embodiment of the invention, the two metallic hinge leaves are secured to the plastic strips by bending portions of the two parallel edges of each leaf inwardly around a plastic strip and into recesses formed on the inner mounting face of the strip. The strips are then preferably cemented to adjacent inner walls of the cover and body of the case which joins the hinge and the case as a unitary structure.

It will be apparent that in thus mounting the metal hinge in the plastic body and cover of the case, the structural strength of the metal hinge and the rigid mounting of the hinge leaves to the plastic strips which are, in turn, securely bonded to the plastic case insures the serviceability of the hinge over a period commensurate with the life of the body and cover of the case. Also, as the hinge structure of the present invention may be readily formed and mounted in the body and cover of the case, substantial savings are effected in the manufacturing costs of plastic cases.

To prevent any strain on the hinge by movement of the cover beyond limits fixed for its open position, the hinge has stop means integral therewith preventing movement of the cover beyond a predetermined extent.

Other objects and advantages of the invention and the various advantages inherent in the same and the features thereof will appear in more detail as this specification proceeds.

Figure 1:
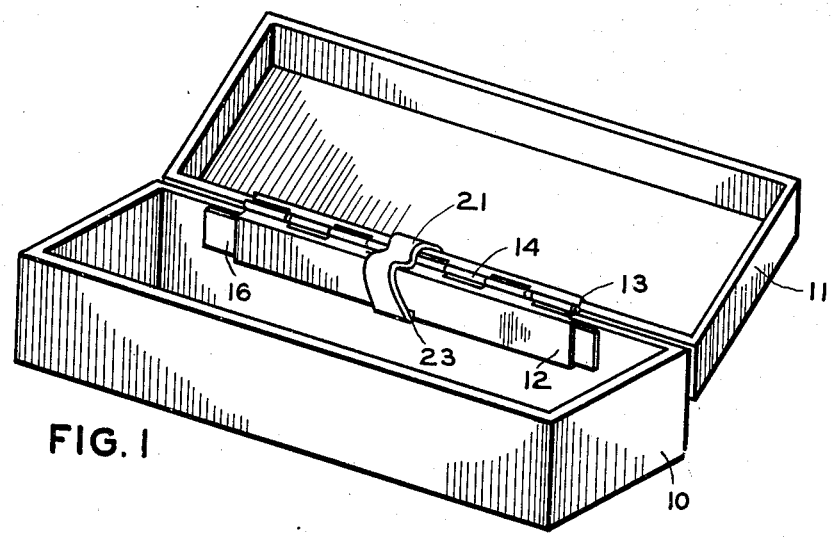
Fig. 1 is a perspective view of the case embodying the present invention, the lid being shown in open position.

As shown in the drawing, and more particularly in Fig. 1, the case embodying the invention comprises a body or receptacle 10 of plastic material having a cover 11 of similar material. Uniting these parts is the improved hinge construction of the present invention comprising two metallic hinge leaves 12 and 13 having tubular members 14 pivotally interconnected by a pintle 15. The leaf 12 is fixed to a plastic strip 16 adhesively connected to an inner wall of the receptacle 10. The leaf 13 is similarly attached to the cover 11 by engagement of the leaf with a strip 17 of plastic material adhesively connected to an inner wall of the cover 11 adjacent the inner wall of the receptacle 10.

In the preferred embodiment of the invention, the hinge leaves 12 and 13 are formed of two elongate blanks of metal, each of which has notches on one of its edges to provide spaced projections of different widths. The tubular hinge members 14 are formed by rolling alternate projections on these edges of the blanks, which projections are so spaced relative to each other on the opposed edges of the blanks that the hinge members formed therefrom may be brought into mating relation with their apertures registering axially to receive the pintle 15 to pivotally interconnect the hinge leaves.

Although the hinge leaves may be secured to the plastic strips in any manner ensuring the fixed attachment of the same, in the preferred embodiment of the invention, the leaves 12 and 13 are secured to the plastic strips 16 and 17, respectively, by crimping the remaining projections on the hinge edge of each leaf inwardly to form fingers 18 disposed within spaced recesses formed in the mounting face of each of the strips 16 and 17 and also reversely turning inwardly the opposed parallel edges of the leaves to form clamping members 19 engaging a recessed edge extending longitudinally of the mounting faces of the strips 16 and 17. It will be apparent that the leaves 12 and 13 are thus securely held on the strips 16 and 17 while permitting the mounting faces of the strips to be mounted flush with the adjacent inner walls of the cover and body of the case respectively.

After the leaves are mounted on the plastic strips 16 and 17, the hinge may be readily mounted in the body and cover of the case. For this purpose the plastic strips are preferably cemented to inner walls of the cover and body of the case, or, if desired, the strips may be integrally united to these walls of the case by heating the plastic strips and the plastic mounting surfaces of the walls of the case sufficiently to bond the strips to the walls upon the application of pressure. In either case the metallic hinge leaves will be securely fastened to the cover and body of the case in a manner insuring the lasting serviceability of the hinge and the case.

To permit the case to be readily opened and closed, a spring 21 hooks into notches 23 formed in the outwardly disposed edges of the hinge leaves 12 and 13. It will be obvious from this construction that when the ends of the spring cross the axis of the pintle 15, as shown in Fig. 1, the spring will tend to retain the cover in open position, while on the other hand, if the case is closed so that the ends of the spring cross the axis of the pintle 15 in the opposite direction, it is equally obvious that the spring will tend to keep the cover in closed position.

Figure 2:
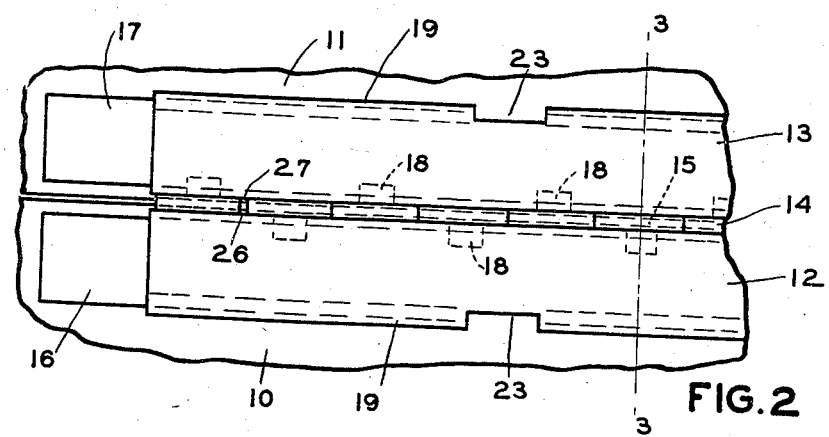
Fig. 2 is a front view of the hinge construction of the present invention and of the case with the cover partly raised and parts of the case broken away.
Figure 4:
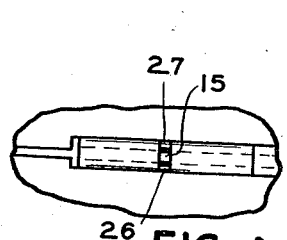
Fig. 4 is an enlarged rear view of the hinge and case with parts broken away.
Figure 3:
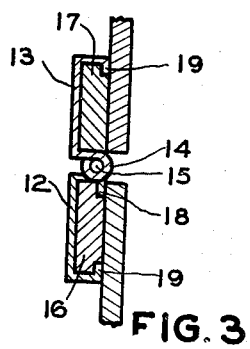
Fig. 3 is a section on line 3—3 of Fig. 2.

To hold the cover in a predetermined open position, stop members are provided on the hinge members for limiting the extent of movement of the cover relative to the receptacle upon actuation of the cover to an open position by the spring 21. For this purpose, and as shown in Figs. 2 and 4, adjacent peripheral edges of two of the hinge members at each end of the hinge are formed to provide interlocking stop members 26 and 27. It will be apparent that when the cover is raised, the spring 21 will force the cover rearwardly of the receptacle 10 until the stop members 26 and 27 are engaged and resist the action of the spring.

While the hinge structure of the present invention has been shown and described in the preferred embodiment of the invention in combination with a plastic case as a finished manufacture, it will be appreciated that the hinge structure may be prefabricated and sold separately from the case as a separate article of manufacture for subsequent mounting in a non-metallic case.

From the foregoing, it will be apparent that I am able to attain the objects of my invention and provide an improved durable hinge construction for zylonite, Celluloid, or other non-metallic cases. Various modifications can, of course, be made without departing from the spirit of my invention or the scope of the appended claims.

I claim:

1. A hinge structure for a plastic receptacle and cover comprising a pair of plastic mounting strips having flat faces in contact with and adhesively attached to adjacent flat walls of said receptacle and said cover; a pair of metallic hinge leaves mounted on said strips, each of said leaves having integral reversely formed spaced edge portions engaging edges of one of said mounting strips; a plurality of spaced apertured hinge members formed on one of the edges of the leaves engaging said mounting strips for interconnecting said leaves; a pintle passing through the apertures of said hinge members to pivotally interconnect said leaves; and stop members formed on at least two of said hinge members for limiting movement of said cover to a predetermined open position.

2. A hinge structure for a plastic receptacle and cover comprising a pair of plastic mounting strips having flat faces in contact with and adhesively connected to adjacent flat inner walls of said receptacle and said cover; a pair of metallic hinge leaves mounted upon said mounting strips, each of said leaves having integral reversely formed clamping members on one edge thereof engaging an edge of one of said strips, and reversely formed spaced fingers on an edge parallel to the first-named edge for engaging the opposite edge of one of said strips; apertured hinge members formed between the spaced fingers of each of said leaves for interconnecting said leaves; and a pintle passing through the apertures of said hinge members to pivotally interconnect said leaves.

JOSEPH W. ASPENLEITER.